United States Patent
Palkar

(10) Patent No.: US 11,615,304 B1
(45) Date of Patent: Mar. 28, 2023

(54) QUANTIZATION AWARE TRAINING BY CONSTRAINING INPUT

(71) Applicant: Ambarella International LP, Santa Clara, CA (US)

(72) Inventor: Malhar Palkar, Cupertino, CA (US)

(73) Assignee: Ambarella International LP, Santa Clara, CA (US)

( * ) Notice: Subject to any disclaimer, the term of this patent is extended or adjusted under 35 U.S.C. 154(b) by 476 days.

(21) Appl. No.: 16/809,644

(22) Filed: Mar. 5, 2020

(51) Int. Cl.
*G06V 10/82* (2022.01)
*G06V 20/52* (2022.01)
*G06N 3/08* (2023.01)
*G06N 3/04* (2023.01)

(52) U.S. Cl.
CPC ............. *G06N 3/08* (2013.01); *G06N 3/04* (2013.01); *G06V 10/82* (2022.01); *G06V 20/52* (2022.01); *G06T 2207/20084* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 2019/0188554 A1* | 6/2019 | Ma | G06N 3/063 |
| 2020/0097818 A1* | 3/2020 | Li | G06N 3/084 |
| 2020/0192970 A1* | 6/2020 | Ma | G06N 3/0635 |
| 2020/0302271 A1* | 9/2020 | Ovtcharov | G06F 7/483 |
| 2021/0089925 A1* | 3/2021 | Partovi Nia | G06F 17/16 |
| 2021/0218997 A1* | 7/2021 | Rezazadegan Tavakoli | H04N 19/192 |

\* cited by examiner

*Primary Examiner* — Idowu O Osifade
(74) *Attorney, Agent, or Firm* — Christopher P. Maiorana, PC

(57) ABSTRACT

A method of generating a quantized neural network comprises (i) receiving a neural network model, (ii) modifying the neural network model by quantizing input of at least convolution layers of the neural network model, and (iii) training the modified neural network model using a dataset that is representative of one or more desired inferences.

20 Claims, 8 Drawing Sheets

QUANTIZATION AWARE TRAINING BY CONSTRAINING INPUT

FIELD OF THE INVENTION

The invention relates to neural networks generally and, more particularly, to a method and/or apparatus for implementing quantization aware training by constraining input.

BACKGROUND

A neural network, more properly referred to as an "artificial" neural network (ANN), is a computing system made up of a number of simple, highly interconnected processing elements, which process information by respective dynamic state responses to external inputs. Neural networks are processing devices (algorithms or actual hardware) that are loosely modeled after the neuronal structure of a brain, but on much smaller scales. A large neural network can have hundreds or thousands of processing units.

Neural networks are typically organized in layers. The layers can comprise a number of interconnected nodes that perform an operation or activation function. Input data is presented to an input layer of the network, which communicates to one or more internal (or hidden) layers where the actual processing is performed via an arrangement of weighted connections. The process of determining the weights for the weighted connections of the neural network is typically referred to as training. The hidden layers connect to an output layer where the result of a prediction model implemented by the neural network is presented. Application of neural networks can require large amounts of memory and computations.

Neural networks typically are trained in floating point precision (e.g., FP(32)). Edge devices typically work at a lower container format to save on bandwidth and computation cost. In general, a container format represents how many bits are used to represent a number. In typical applications, numbers are represented by 8 bit, 16 bit, or 32 bit container formats. In general, any number range can be represented with these container formats. For example, if an 8 bit container format is used to represent a number range from 0-255 (i.e., 0=0, 1=1, etc.), the precision is said to be 1. If an 8 bit container format is used to represent a number range from 0-510, then 0=0, 1=2, 2=4, etc. In this case, precision is lost (i.e., the precision is 2 instead of 1). Similarly, an 8 bit container format with a precision of 0.5 would represent the number range from 0-128 as 0=0, 1=0.5, etc. A lower container format leads to a trade off between range and precision.

A lower fixed point container format is generally preferred for most edge devices because fixed point container formats offer more computational savings. Converting floating point data to fixed point data, generally referred to as quantization, is a lossy process. When a neural network is ported to an edge device, the inference accuracy of the neural network may be lower than the original floating point format model due to quantization.

On many hardware architectures, the fixed point data format (e.g., FIX8, FIX16, etc.) of each layer in the neural network can be set individually. This flexibility allows determining the output data format of each layer by running inference on a representative dataset. Statistics like min, max, and variance are recorded, and the statistics used to pick the data format of each layer. This process is called post training quantization. Post training quantization tries to minimize the reduction in inference accuracy due to quantization. From a perspective of an end user, the effort required in porting the neural network to the edge device is minimal with post training quantization. However, the accuracy of the network generated utilizing post training quantization may still be lower than the original accuracy because no new information is added to the neural network. The amount of quantization loss depends on the complexity of the neural network and the size of the representative dataset.

Another technique to minimize the reduction in inference accuracy due to quantization is called quantization aware training. Quantization aware training ensures that the forward pass matches precision for both training and inference. Quantization aware training models the effect of quantization loss into the neural network and can result in better accuracy on edge devices. During the process of quantization aware training, the network learns the data format for a given container format. The "learned" data format chooses the right trade off between accuracy and precision from the given data set. However, on edge devices, the accuracy of the network is not determined just by quantization loss in convolution layers. Other constraints (e.g., concat operations) can restrict data format selections, which do not get modeled in quantization aware training. Typically, concat operations require the input number range to be identical so that there is one number range for output. If the input number range is not identical, the input gets quantized to bring the input to the same range. Other examples of constraints include transcendental operations (e.g., tan h, softmax, etc.). Since the constraints are not modeled in quantization aware training, the expected accuracy is not typically achieved.

It would be desirable to implement quantization aware training by constraining input.

SUMMARY

The invention concerns a method of generating a quantized neural network comprising (i) receiving a neural network model, (ii) modifying the neural network model by quantizing input of at least convolution layers of the neural network model, and (iii) training the modified neural network model using a dataset that is representative of one or more desired inferences.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the invention include providing quantization aware training by constraining input that may (i) modify a neural network model prior to training, (ii) quantize inputs rather than outputs of sensitive layers, (iii) allow outputs of all layers to remain in higher container format with higher precision, (iv) provide a trained neural network capable of running on edge devices that are optimized for smaller container formats, (v) allow quantized input with no performance impact, and/or (vi) be implemented as one or more integrated circuits.

The method described below generally provides an alternate way of performing quantization aware training. Instead of quantizing outputs of sensitive layers, the inputs of those layers are generally quantized. The outputs of all of the layers of the neural network model being trained are left at a higher container format with higher precision. Most of edge devices are generally optimized for smaller container formats for computationally intensive layers such as convolution. Quantizing the inputs generally has no impact on performance of the neural network model. The computationally intense layers still work in smaller container formats.

Figure 1:
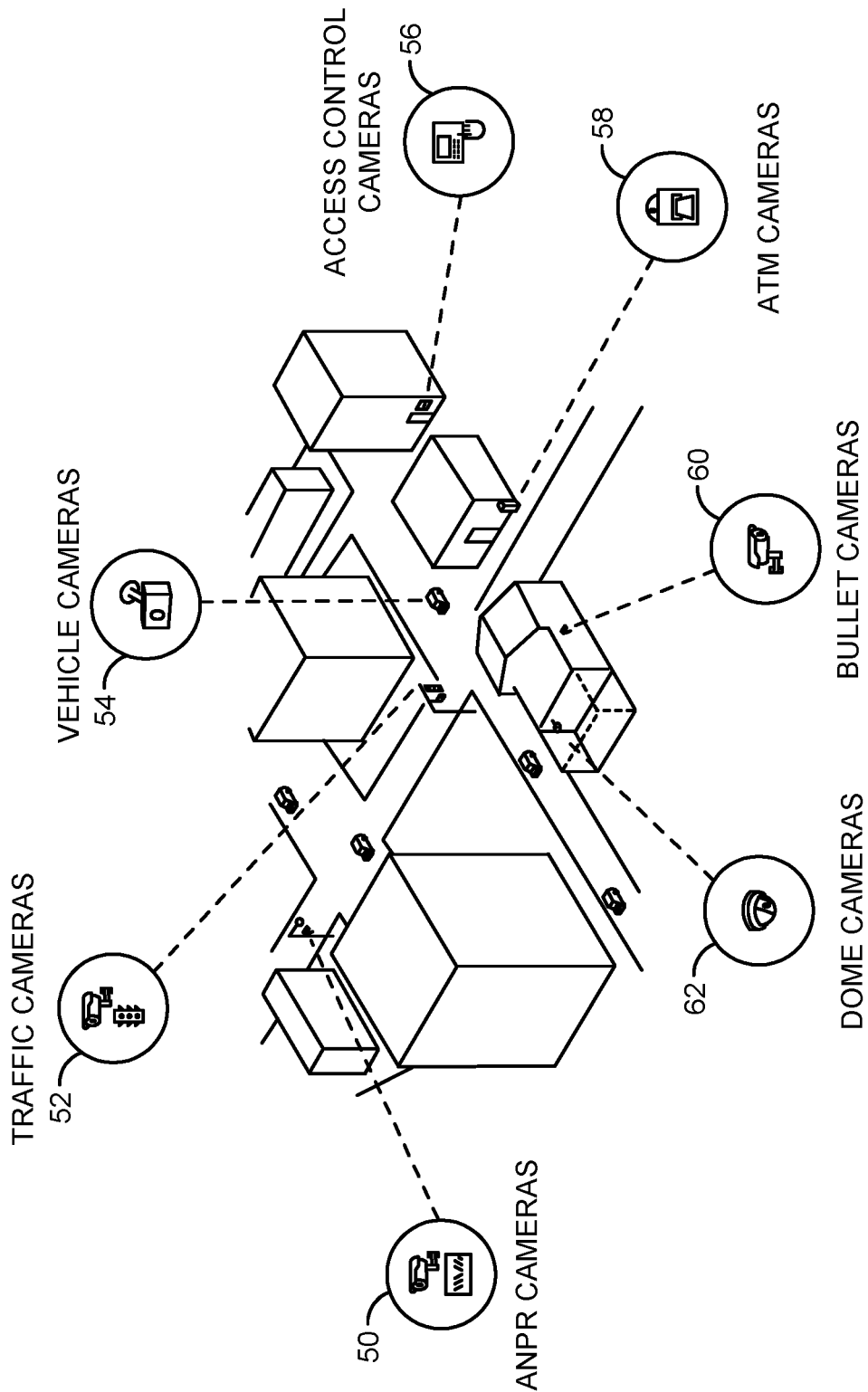
FIG. 1 is a diagram illustrating examples of edge devices that may utilize a quantized neural network generated in accordance with example embodiments of the invention.

Referring to FIG. 1, a diagram is shown illustrating examples of edge devices that may utilize a quantized neural network generated in accordance with example embodiments of the invention. In an example, edge devices may include low power technology designed to be deployed in embedded platforms at the edge of a network (e.g., microprocessors running on sensors, cameras, or other battery-powered devices), where power consumption is a critical concern. In an example, edge devices may comprise traffic cameras and intelligent transportation systems (ITS) solutions including automated number plate recognition (ANPR) cameras 50, traffic cameras 52, vehicle cameras 54, access control cameras 56, automatic teller machine (ATM) cameras 58, bullet cameras 60, and dome cameras 62. In an example, the traffic cameras and intelligent transportation systems (ITS) solutions may be designed to enhance roadway security with a combination of person and vehicle detection, vehicle make/model recognition, and automatic number plate recognition (ANPR) capabilities. In an example, person and vehicle detection, vehicle make/model recognition, and automatic number plate recognition (ANPR) capabilities may be facilitated utilizing quantized neural network technology in accordance with embodiments of the invention.

Figure 2:
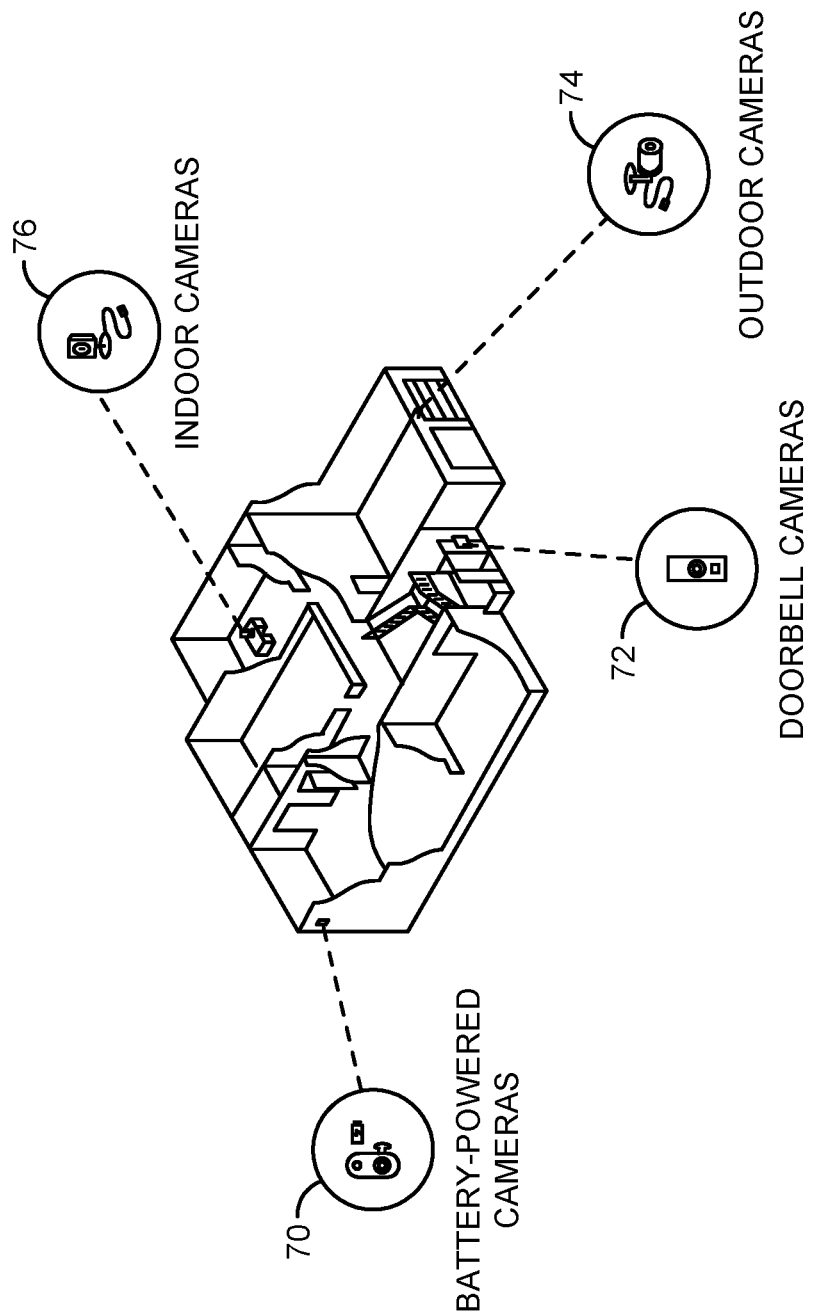
FIG. 2 is a diagram illustrating additional examples of edge devices that may utilize a quantized neural network generated in accordance with example embodiments of the invention.

Referring to FIG. 2, a diagram is shown illustrating additional examples of edge devices that may utilize a quantized neural network generated in accordance with example embodiments of the invention. In an example, edge devices may comprise security camera applications. In an example, the security camera applications may include battery-powered cameras 70, doorbell cameras 72, outdoor cameras 74, and indoor cameras 76. In an example, the security camera application edge devices may include low power technology designed to be deployed in embedded platforms at the edge (e.g., microprocessors/controllers running on battery-powered devices), where power consumption is a critical concern. The security camera applications may realize performance benefits from application of quantized neural network technology in accordance with embodiments of the invention. In an example, an edge device utilizing a quantized neural network generated in accordance with an embodiment of the invention may take massive amounts of image data and make on-device inferences to obtain useful information with reduced bandwidth and/or reduced power consumption.

In various embodiments, the quantized neural network is generally trained to adapt to a smaller container format of an edge device on which the quantized neural network will be utilized. The inference quality provided by the quantized neural network may be better than an inference quality provided by post training quantization or conventional quantization aware training. The quantized neural network generally converges faster than conventional quantization aware training.

Figure 3:
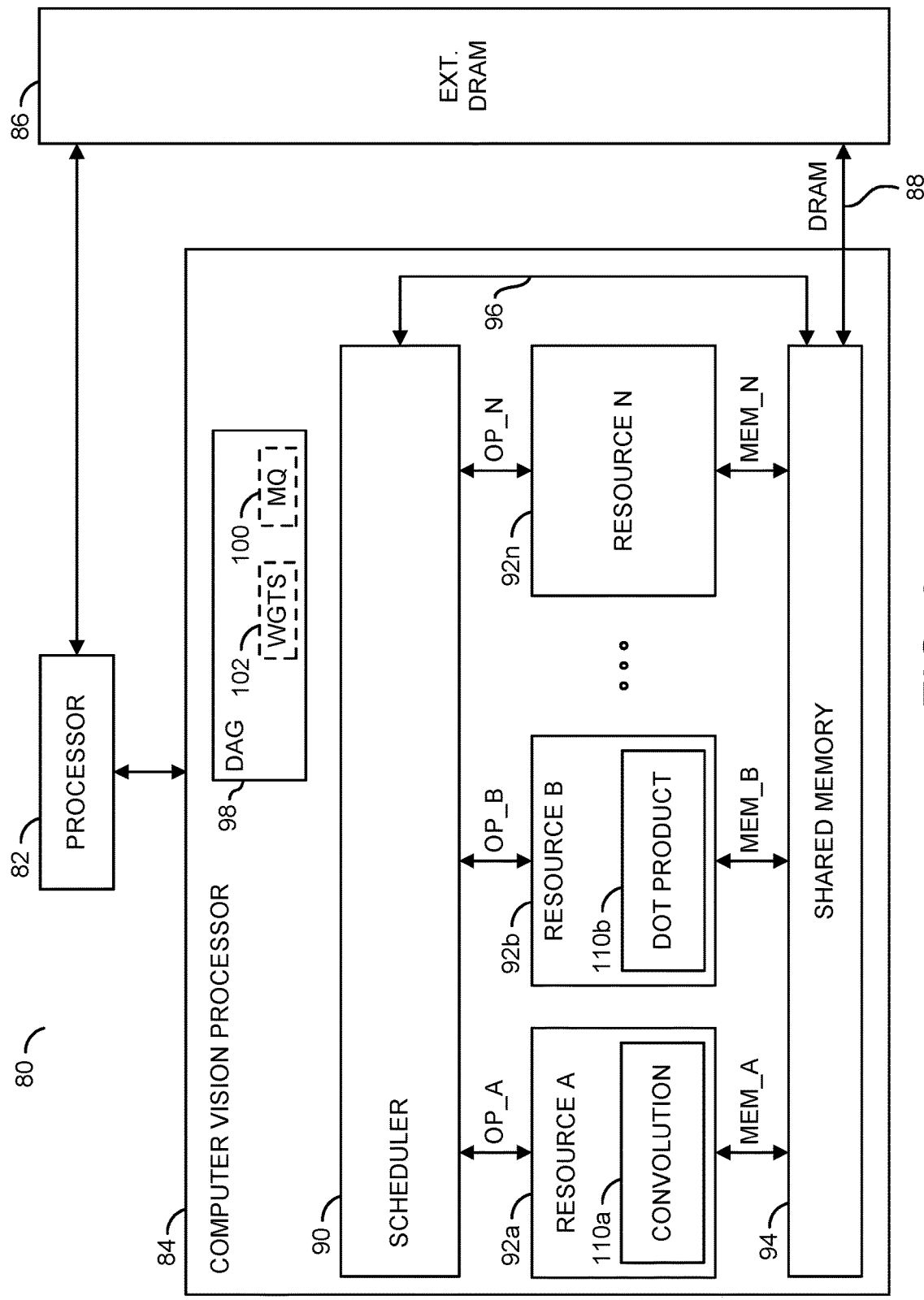
FIG. 3 is a diagram illustrating a system in which a quantized neural network generated in accordance with example embodiments of the invention may be utilized.

Referring to FIG. 3, a diagram is shown illustrating a system in which a quantized neural network generated in accordance with example embodiments of the invention may be utilized. In an example, a system (or apparatus) 80 may be implemented as part of a computer vision system. In various embodiments, the system 80 may be implemented in an edge device. In an example, the system 80 may be implemented as part of a sensor, a camera, a computer, a server (e.g., a cloud server), a smart phone (e.g., a cellular telephone), a personal digital assistant, etc. The system 80 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the system 80 generally comprises hardware circuitry that is optimized to provide a high performance image processing and computer vision pipeline in minimal area and with minimal power consumption. In an example, various operations used to perform image processing, feature detection/extraction, and/or object detection for computer (or machine) vision may be implemented using hardware modules designed to reduce computational complexity and use resources efficiently.

In an example embodiment, the system 80 generally comprises a block (or circuit) 82, a block (or circuit) 84, a block (or circuit) 86, and/or a memory bus 88. The circuit 82 may implement a first processor. The circuit 84 may implement a second processor. The circuit 86 may implement an external memory (e.g., a memory external to the circuits 82 and 84). In an example, the circuit 84 may implement a computer vision processor. In an example, the processor 84 may be an intelligent vision processor. The system 80 may comprise other components (not shown). The number, type and/or arrangement of the components of the system 80 may be varied according to the design criteria of a particular implementation.

The circuit 82 may implement a processor circuit. In some embodiments, the processor 82 may be implemented using a general purpose processor circuit. The processor 82 may be operational to interact with the circuit 84 and the circuit 86 to perform various processing tasks. In an example, the processor 82 may be configured as a controller for the circuit 84. The processor 82 may be configured to execute computer readable instructions. In one example, the computer readable instructions may be stored by the circuit 86. In some embodiments, the computer readable instructions may comprise controller operations. The processor 82 may be configured to communicate with the circuit 84 and/or access results generated by components of the circuit 84. In an example, the processor 82 may be configured to utilize the circuit 84 to perform operations associated with a neural network model.

In an example, the processor 82 may be configured to program the circuit 84 with a pre-trained quantized neural network model (MQ) 100 and weights (WGTS) 102 generated using a training process in accordance with an example embodiment of the invention. In various embodiments, the quantized neural network model (MQ) 100 may be configured (trained) for operation in an edge device. In an example, the system 80 may be coupled to a sensor (e.g., video camera, etc.) configured to generate a data input. The system 80 may be configured to generate one or more outputs in response to the data input from the sensor based on one or more inferences made by executing the pre-trained quantized neural network model (MQ) 100 with the weights (WGTS) 102. The MQ 100 may be configured (e.g., trained) to compensate (reduce) an effect of a quantization loss or other constraints related to the edge device implementing the system 80. The operations performed by the processor 82 may be varied according to the design criteria of a particular implementation.

In various embodiments, the circuit 86 may implement a dynamic random access memory (DRAM) circuit. The circuit 86 is generally operational to store multidimensional arrays of input data elements and various forms of output data elements. The circuit 86 may exchange the input data elements and the output data elements with the processor 82 and the processor 84.

The processor 84 may implement a computer vision processor circuit. In an example, the circuit 84 may be configured to implement various functionality used for computer vision. The processor 84 is generally operational to perform specific processing tasks as arranged by the processor 82. In various embodiments, all or portions of the processor 84 may be implemented solely in hardware. The processor 84 may directly execute a data flow directed to execution of the quantized neural network model (MQ) 100, and generated by software (e.g., a directed acyclic graph, etc.) that specifies processing (e.g., computer vision) tasks. In some embodiments, the processor 84 may be a representative example of numerous computer vision processors implemented by the system 80 and configured to operate together.

In an example, the processor 84 generally comprises a block (or circuit) 90, one or more blocks (or circuits) 92a-92n, a block (or circuit) 94, a path 96, and a block (or circuit) 98. The block 90 may implement a scheduler circuit. The blocks 92a-92n may implement hardware resources (or engines). The block 94 may implement a shared memory circuit. The block 98 may implement a directed acyclic graph (DAG) memory. In an example embodiment, one or more of the circuits 92a-92n may comprise blocks (or circuits) 110a-110n. In the example shown, circuits 110a and 110b are implemented.

In an example, the circuit 110a may implement convolution operations. In another example, the circuit 110b may be configured to provide dot product operations. The convolution and dot product operations may be used to perform computer (or machine) vision tasks (e.g., as part of an object detection process, etc.). In yet another example, one or more of the circuits 92c-92n may comprise blocks (or circuits) 110c-110n (not shown) to provide convolution calculations in multiple dimensions. An example implementation of a convolution calculation scheme that may be used by one or more of the circuits 92a-92n may be found in co-pending U.S. application Ser. No. 15/403,540, filed Jan. 11, 2017, which is herein incorporated by reference in its entirety.

In an example, the circuit 84 may be configured to receive directed acyclic graphs (DAGs) from the processor 82. The DAGs received from the processor 82 may be stored in the DAG memory 98. The circuit 84 may be configured to execute a DAG for the MQ 100 using the circuits 90, 92a-92n, and 94.

Multiple signals (e.g., OP_A to OP_N) may be exchanged between the circuit 90 and the respective circuits 92a-92n. Each signal OP_A to OP_N may convey execution operation information and/or yield operation information. Multiple signals (e.g., MEM A to MEM N) may be exchanged between the respective circuits 92a-92n and the circuit 94. The signals MEM A to MEM N may carry data. A signal (e.g., DRAM) may be exchanged between the circuit 86 and the circuit 94. The signal DRAM may transfer data between the circuits 86 and 106 (e.g., on the memory bus 88).

The circuit 90 may implement a scheduler circuit. The scheduler circuit 90 is generally operational to schedule tasks among the circuits 92a-92n to perform a variety of computer vision related tasks as defined by the processor 82. Individual tasks may be allocated by the scheduler circuit 90 to the circuits 92a-92n. The scheduler circuit 90 may allocate the individual tasks in response to parsing the directed acyclic graphs (DAGs) provided by the processor 82. The scheduler circuit 90 may time multiplex the tasks to the circuits 92a-92n based on the availability of the circuits 92a-92n to perform the work.

Each circuit 92a-92n may implement a processing resource (or hardware engine). The hardware engines 92a-92n are generally operational to perform specific processing tasks. The hardware engines 92a-92n may be implemented to include dedicated hardware circuits that are optimized for high-performance and low power consumption while performing the specific processing tasks. In some configurations, the hardware engines 92a-92n may operate in parallel and independent of each other. In other configurations, the hardware engines 92a-92n may operate collectively among each other to perform allocated tasks.

The hardware engines 92a-92n may be homogenous processing resources (e.g., all circuits 92a-92n may have the same capabilities) or heterogeneous processing resources (e.g., two or more circuits 92a-92n may have different capabilities). The hardware engines 92a-92n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In various embodiments, the hardware engines 92a-92n may be implemented solely as hardware circuits. In some embodiments, the hardware engines 92a-92n may be implemented as generic engines that may be configured through circuit customization and/or software/firmware to operate as special purpose machines (or engines). In some embodiments, the hardware engines 92a-92n may instead be implemented as one or more instances or threads of program code executed on the processor 82 and/or one or more processors 84, including, but not limited to, a vector processor, a central processing unit (CPU), a digital signal processor (DSP), or a graphics processing unit (GPU). In some embodiments, one or more of the hardware engines 92a-92n may be selected for a particular process and/or thread by the scheduler 90. The scheduler 90 may be configured to assign the hardware engines 92a-92n to particular tasks in response to parsing the directed acyclic graphs stored in the DAG memory 98.

The circuit 94 may implement a shared memory circuit. The shared memory 94 may be configured to store data in response to input requests and/or present data in response to output requests (e.g., requests from the processor 82, the DRAM 86, the scheduler circuit 90 and/or the hardware engines 92a-92n). In an example, the shared memory circuit 94 may implement an on-chip memory for the computer vision processor 84. The shared memory 94 is generally operational to store all of or portions of the multidimensional arrays (or vectors) of input data elements and output data elements generated and/or utilized by the hardware engines 92a-92n. The input data elements may be transferred to the shared memory 94 from the DRAM circuit 86 via the memory bus 88. The output data elements may be sent from the shared memory 94 to the DRAM circuit 86 via the memory bus 88.

The path 96 may implement a transfer path internal to the processor 84. The transfer path 96 is generally operational to move data from the scheduler circuit 90 to the shared memory 94. The transfer path 96 may also be operational to move data from the shared memory 94 to the scheduler circuit 90.

The processor 82 is shown communicating with the computer vision processor 84. The processor 82 may be configured as a controller for the computer vision processor 84. In some embodiments, the processor 82 may be configured to transfer instructions to the scheduler 90. For example, the processor 82 may provide one or more directed acyclic graphs to the scheduler 90 via the DAG memory 98. The scheduler 90 may initialize and/or configure the hardware engines 92a-92n in response to parsing the directed acyclic graphs. In some embodiments, the processor 82 may receive status information from the scheduler 90. For example, the scheduler 90 may provide a status information and/or readiness of outputs from the hardware engines 92a-92n to the processor 82 to enable the processor 82 to determine one or more next instructions to execute and/or decisions to make. In some embodiments, the processor 82 may be configured to communicate with the shared memory 94 (e.g., directly or through the scheduler 90, which receives data from the shared memory 94 via the path 96). The processor 82 may be configured to retrieve information from the shared memory 94 to make decisions. The instructions performed by the processor 82 in response to information from the computer vision processor 84 may be varied according to the design criteria of a particular implementation.

Figure 4:
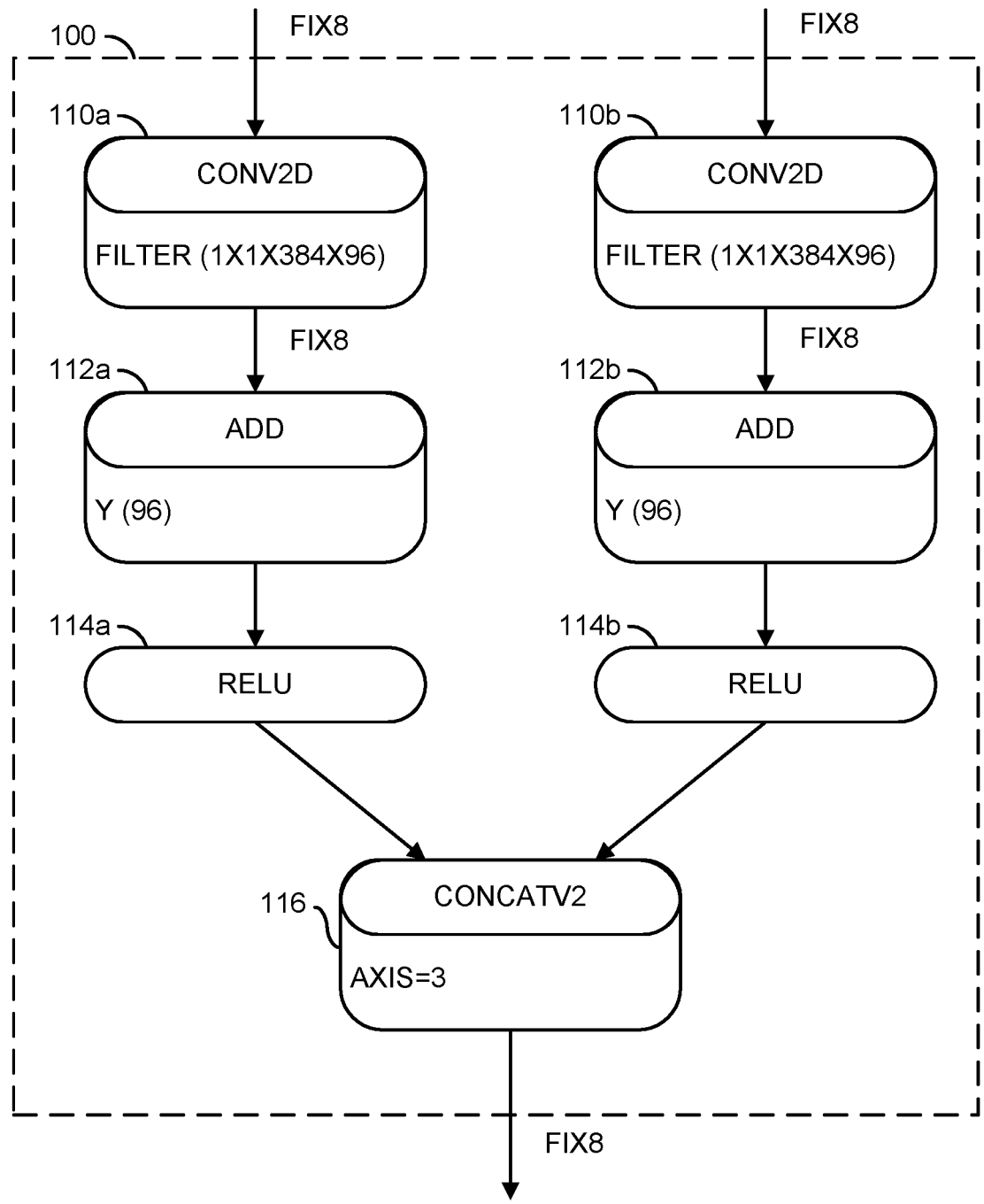
FIG. 4 is a diagram illustrating a portion of neural network graph with no input constraints.

Referring to FIG. 4, a diagram is shown illustrating a portion of a neural network graph prior to insertion of input constraints. In an example, the neural network graph represents portions of the quantized neural network 100. In an example, the portion of the neural network graph may include four layers: a first layer 110 performing convolution, a second layer 112 performing summing or pooling, a third layer 114 providing an activation function, and a fourth layer 116 performing concatenation. In an example, the first layer 110 may comprise convolution operators 110a and 110b, the second layer 112 may comprise summing operators 112a and 112b, the third layer 114 may comprise activation functions 114a and 114b, and the fourth layer 116 may comprise a concatenation operator.

In an example, a Conv2D class may be used to implement the convolution operators 110a and 110b, a rectified linear unit (RELU) may be used to implement the activation function operators 114a and 114b, and a ConcatV2 class may be used to implement the concatenation layer 116. In an example, the Conv2D operators 110a and 110b may be configured with a filter size of 1×1×384×96. The summing operators 112a and 112b may be configured to sum a number of outputs (e.g., 96) of the respective convolution operators 110a and 110b. Outputs of the summing operators 112a and 112b may be presented to the respective RELU operators 114a and 114b. Outputs of the RELU operators 114a and 114b may be presented to respective inputs of the concatenation operator 116.

The graph shown in FIG. 4 generally illustrates a neural network where convolution involves heavy computations. In an example, on edge devices convolutions may be performed in a FIX8 container format. In conventional quantization aware training, a quantization layer is inserted on the output of the convolution layer. The exact data format is learned by the neural network based on min/max calculation of the quantization operations on the output of the convolution operators. So even though the container format is FIX8, the range of data may not be the same. Most edge devices need identical formats for non mathematical operations like concatenation, reshape, etc. The need for identical formats causes another quantization point, which is non-existent in the original training framework. It is possible to add another quantization point, however that adds complexity to the training graph.

Figure 5:
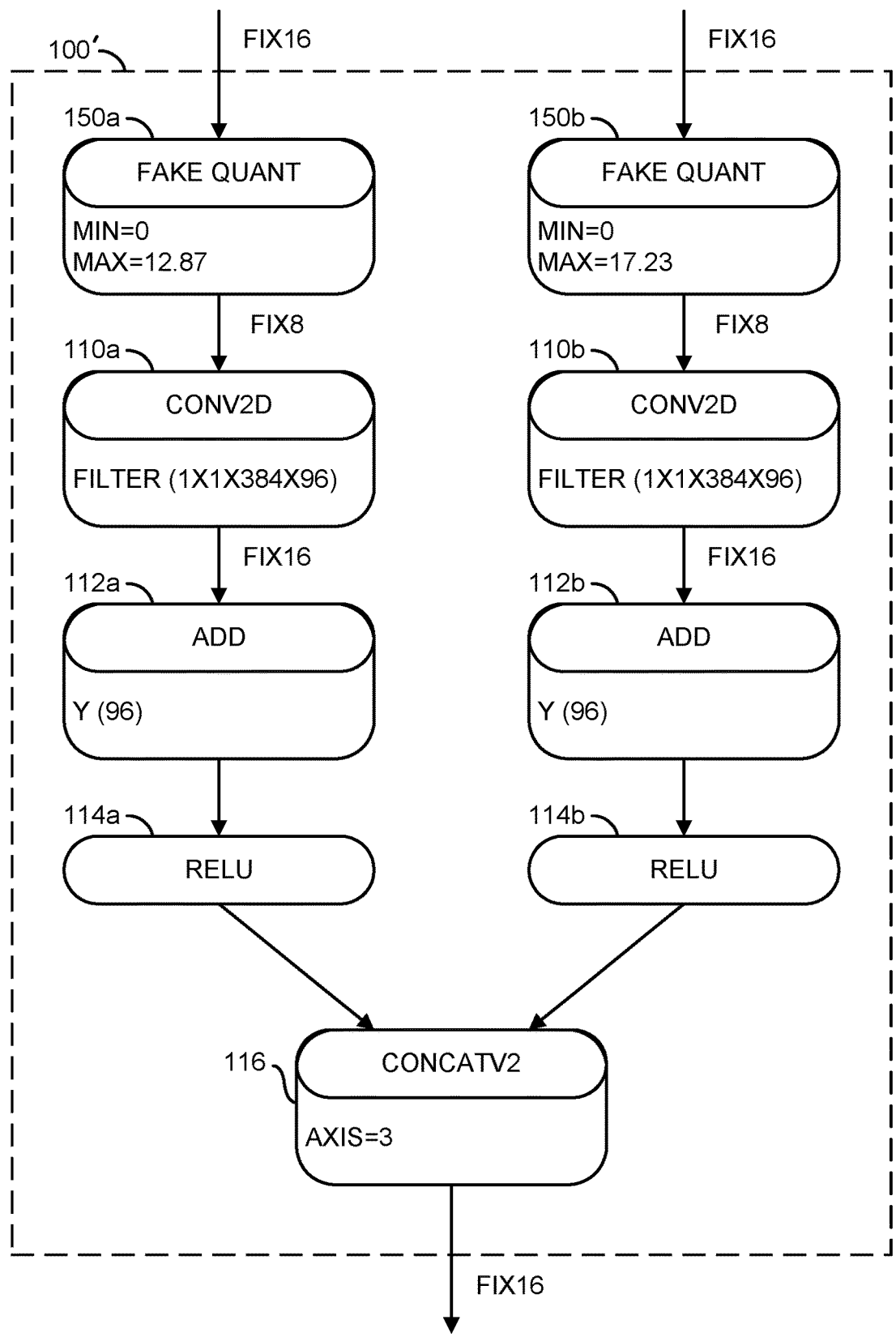
FIG. 5 is a diagram illustrating a portion of a neural network graph modified to include input constraints in accordance with example embodiments of the invention.

Referring to FIG. 5, a diagram is shown illustrating the portion of the neural network graph of FIG. 4 modified to include input constraints in accordance with example embodiments of the invention. In various embodiments, the training framework in accordance with an embodiment of the invention may add quantization training nodes (e.g., FakeQuant_with_min_max_vars operators, etc.) 150a and 150b at the input of the convolution layer 110 instead of at the output of the convolution layer 110. In an example, the quantization operations 150a and 150b may comprise a gradient that allows training minimum and maximum values for quantizing the inputs of convolution layer 110. The minimum and maximum values for quantizing the inputs of the convolution operators 110a and 110b may be determined from a dataset used to train the modified neural network model 100'. The quantization operations 150a and 150b generally take into account a data container format of an edge device on which the neural network model 10—will be executed.

In an example, the input container format of the quantization operators may be FIX16. The output container format of the quantization operators may be bigger (e.g., FLOAT16). Due to restricted input data formats, the range of the output is also limited. However since the output may have a bigger container format, even if there are further requantization points the range or precision of convolution is not affected. Unlike conventional quantization aware training, the quantization training nodes 150a and 150b may introduce additional nodes to restrict data at the input of convolution. Even with additional computations and additional memory requirement, overall performance may be improved as additional computation for requantization may run in parallel with convolutions. The additional memory requirement is generally negligible compared to the overall model.

Figure 6:
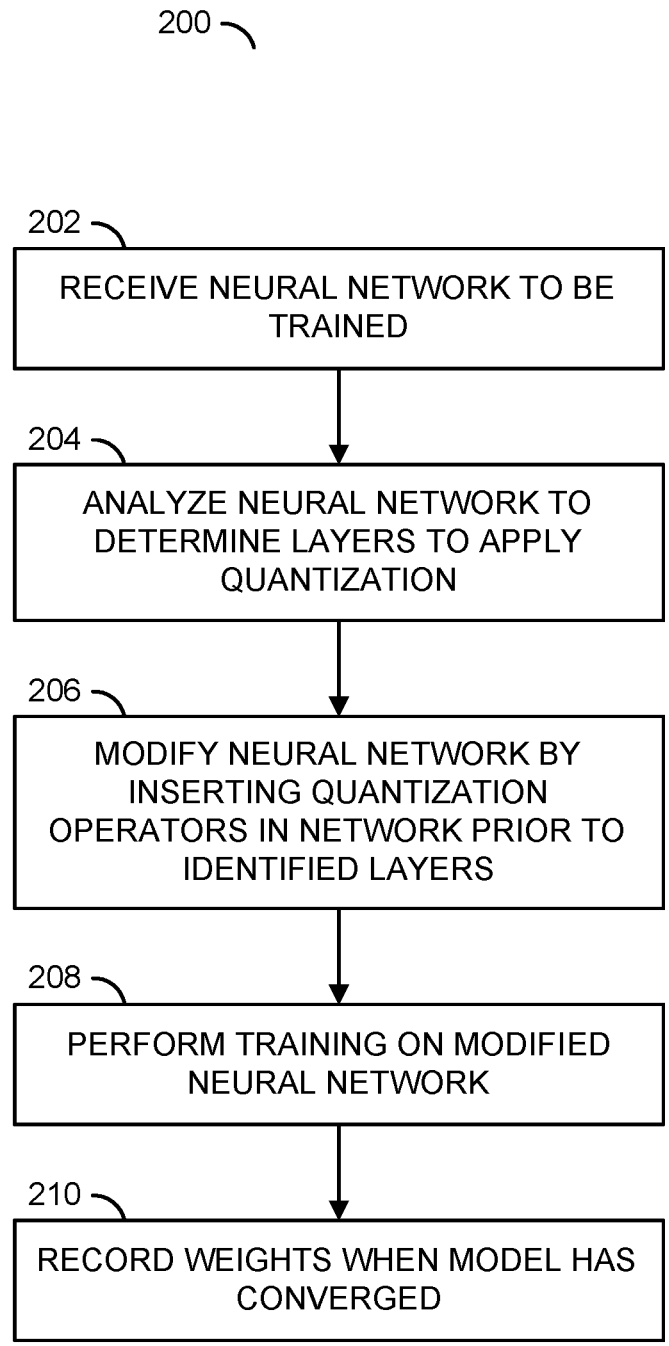
FIG. 6 is a flow diagram illustrating a process in accordance with example embodiments of the invention.

Referring to FIG. 6, a flow diagram is shown illustrating a quantization aware training process 200 in accordance with example embodiments of the invention. In an example, the process (or method) 200 may comprise a step (or state) 202, a step (or state) 204, a step (or state) 206, a step (or state) 208, a step (or state) 210, a step (or state) 212, a decision step (or state) 214, and a step (or state) 216. The process 200 may begin in the step 202 by receiving a neural network model to be trained. The process 200 may then move to the step 204. In the step 204, the process 200 may analyze a number of layers of the neural network model to be trained to identify layers having input to be quantized. The process 200 may then move to the step 206.

In the step 206, the process 200 may modify the neural network graph by inserting quantization operators (e.g., Fake_Quantization_with_min_max_vars) prior to the identified layers. The process 200 then moves to the step 208. In the step 208, the process 200 generally performs a quantization aware training operation using a representative data set provided with the original neural network model. A number of iterations of the quantization aware training operation may be needed until the neural network model converges. When the neural network model has converged, the process 200 may move to the step 210. In the step 210, the process 200 generally records iteratively determined weights/kernels for the quantized neural network model. The quantized neural network model (e.g., MQ 100) and the weights/kernels (e.g., WGTS 102) determined through training may then be used to program an edge device.

Figure 7:
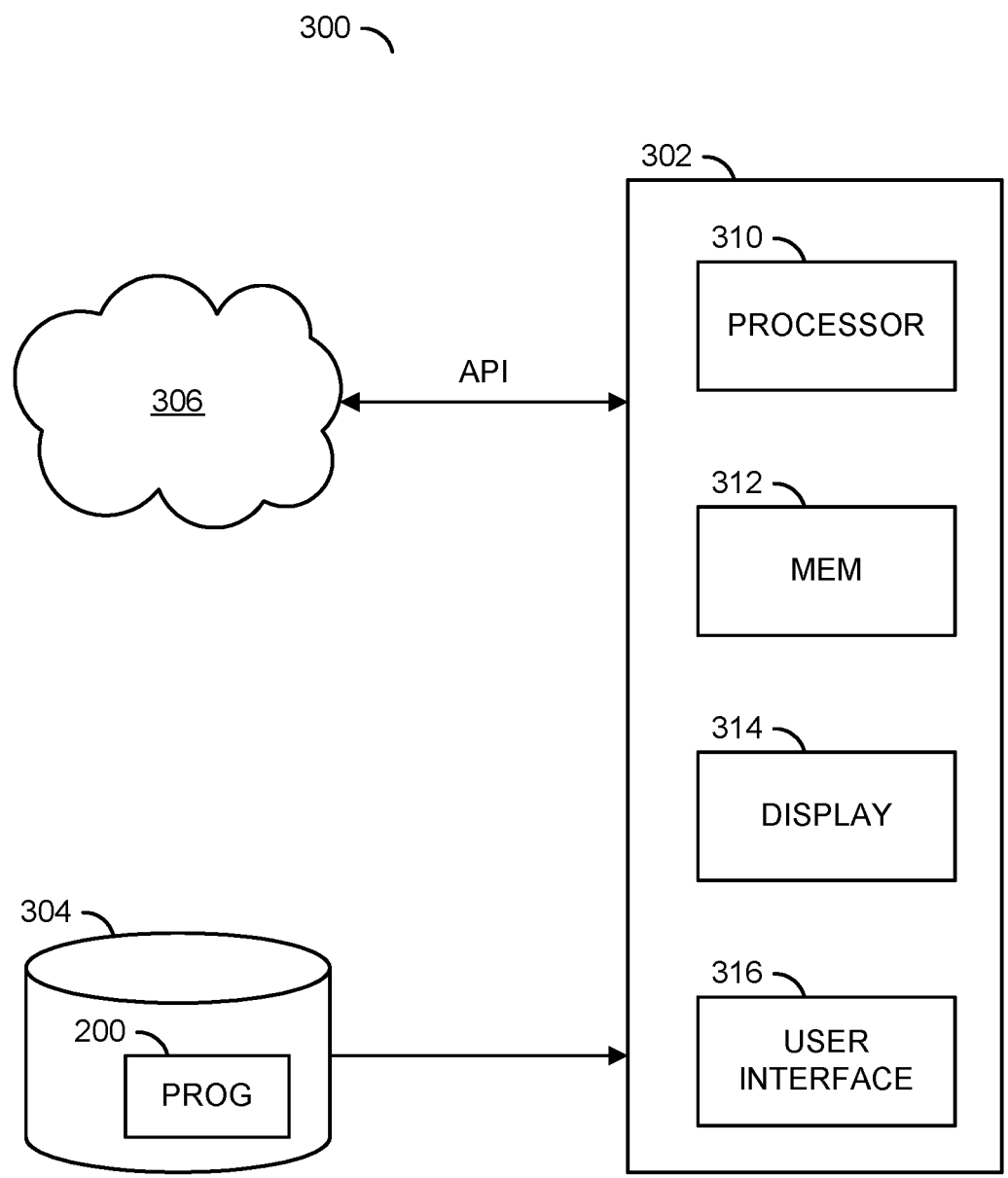
FIG. 7 is a diagram illustrating an example of a computer system in which the process of FIG. 6 may be implemented.

Referring to FIG. 7, a diagram is shown illustrating a context in which the process 200 of FIG. 6 may be implemented. In an example, a system 300 may be configured (e.g., through software) to perform the process 200 on a previously generated neural network. In an example, the system 300 may comprise a computer 302 and a computer readable storage medium 304. In an example, the computer 302 may be implemented as a general purpose computer system. In an example, the computer readable storage medium 304 may include, but is not limited to, a magnetic storage medium (e.g., a hard disk drive or HDD), an optical storage medium (e.g., compact disc (CD), digital video disc (DVD), BluRay disc (BD), a solid state drive (SSD), and/or a network associated storage system (NAS). In an example, the computer 302 and the computer readable storage medium 304 may be coupled together to exchange programs and data. In an example, a program (or programs) implementing the process 200 may be stored on the computer readable storage medium 304 or in cloud based resources 306. In an example, the computer 302 may be further configured to perform the process 200 utilizing the cloud resources 306. In an example, the computer 302 may be configured to perform the process 200 via an application program interface (API).

In an example, the computer 302 may include, but is not limited to, a processor 310, memory 312, a display 314, and a user interface 316. In various embodiments, the processor 310 may include, but is not limited to, a central processing unit (CPU), a graphics processing unit (GPU), and a video processing unit (VPU). In various embodiments, the memory 312 may include, but is not limited to, random access memory (e.g., SRAM, DRAM, FLASH, etc.), read only memory (ROM), and cache memory. The display 314 and the user interface 316 generally allow a user to initiate and monitor the computer 302 performing the process 200.

Figure 8:
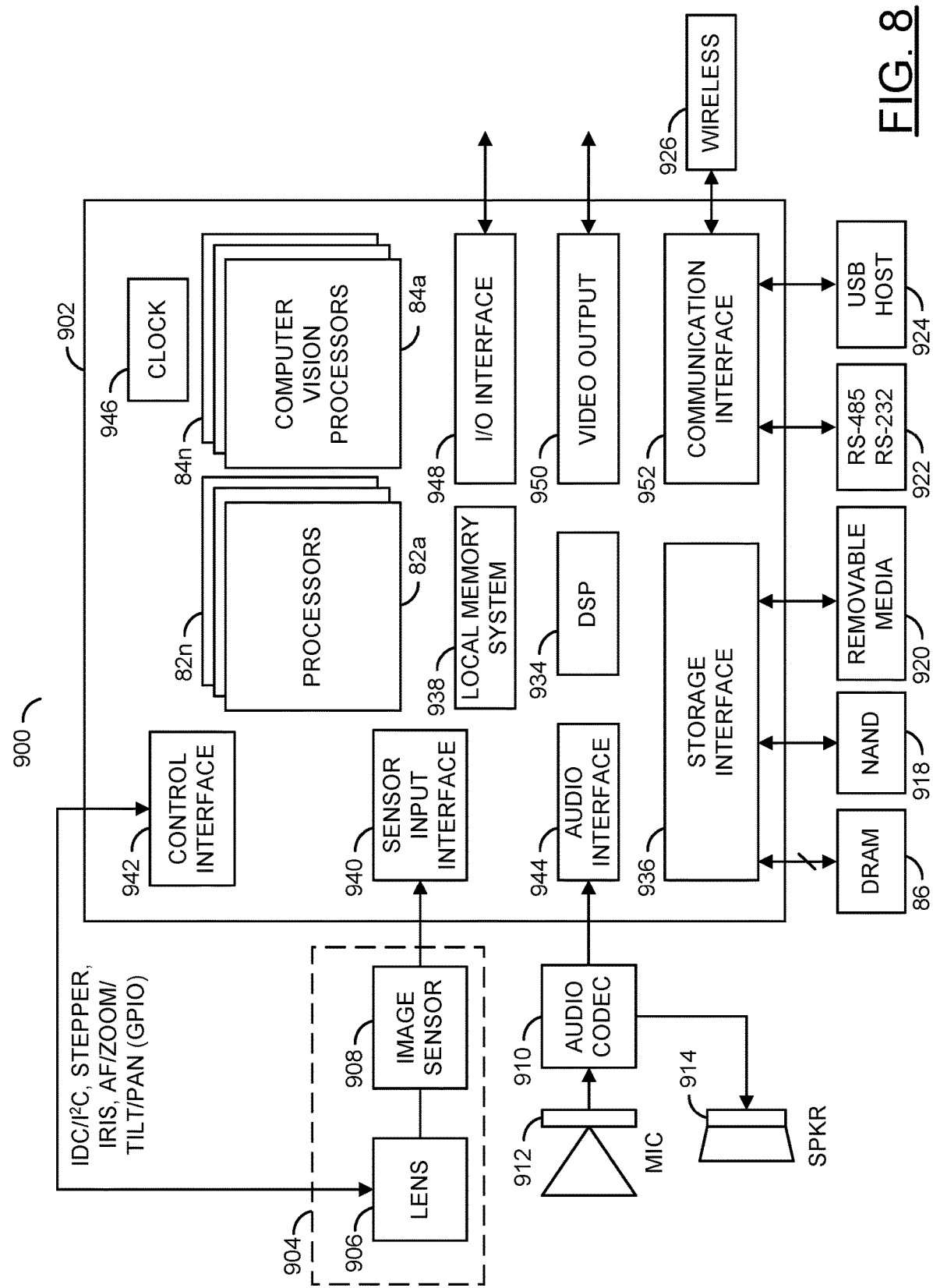
FIG. 8 is a diagram illustrating a context in which a quantized neural network generated in accordance with example embodiments of the invention may be utilized.

Referring to FIG. 8, a diagram illustrating a camera system 900 in accordance with an embodiment of the invention is shown. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the processors, circuits, and processes described above in connection with FIG. 1 through FIG. 5.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be an image sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near a camera. The lens assembly 906 may capture and/or focus light for the image sensor 908. The lens assembly 906 may implement an optical lens. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) the external memory 86, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of instances of the processor 82 (e.g., the processors 82a-82n), a number of instances of the processor 84 (e.g., the processors 84a-84n), a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, and/or a block (or circuit) 952. In various embodiments, the circuits 82a-82n may include one or more embedded processors (e.g., ARM, etc.). In an example, one or more of the circuits 84a-84n may implement a quantized neural network in accordance with an example embodiment of the invention. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 86, the non-volatile memory 918, and the removable media 920. One or more of the DRAM 86, the non-volatile memory 918 and/or the removable media 920 may store computer readable instructions. The computer readable instructions may be read and executed by the processors 82a-82n. In response to the computer readable instructions, the processors 82a-82n may be operational to operate as controllers for the processors 84a-84n. For example, the resources 92a-92n of the processors 84a-84n may be configured to efficiently perform various specific operations in hardware and the processors 82a-82n may be configured to make decisions about how to handle input/output to/from the various resources 92a-92n.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. In an example, the DAG memory 98 may be implemented in the local memory system 938. The circuit 940 may implement a sensor input (or interface). The circuit 942 may implement one or more control interfaces including but not limited to an inter device communication (IDC) interface, an inter integrated circuit (I²C) interface, a serial peripheral interface (SPI), and a pulse width modulation (PWM) interface. The circuit 944 may implement an audio interface (e.g., an I²S interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuits 82a-82n, 84a-84n and 934 through 952 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 86, the NAND 918, etc.). When executed by one or more of the processors 82a-82n, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 86, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 82a-82n and/or one or more of the processors 84a-84n. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I²S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee, USB, Wi-Fi, UART, etc.). In one example, the communication module 952 may implement a secure digital input output (SDIO) interface. The communication module 952 may include support for wireless communication by one or more wireless and/or cellular protocols such as Bluetooth®, ZigBee, Z-Wave, LoRa, Wi-Fi IEEE 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, 5G, SMS, LTE M, NB-IoT, etc. Communication devices may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 902 may also include support for communication using one or more of the universal serial bus protocols (e.g., USB 1.0, 2.0, 3.0, etc.). The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method of generating a quantized neural network comprising:
   receiving a neural network model comprising a plurality of layers having a first input and output container format;
   modifying the neural network model by quantizing inputs of at least convolution layers of the neural network model from said first input and output container format to a second container format based on a range of input data defined by a minimum input value and a maximum input value; and
   training the modified neural network model using a dataset that is representative of one or more desired inferences.

2. The method according to claim 1, wherein said neural network model comprises a directed acyclic graph.

3. The method according to claim 1, wherein modifying the neural network model comprises inserting pseudo-quantization operations to quantize the inputs of the convolution layers of the neural network model.

4. The method according to claim 3, wherein said pseudo-quantization operations comprise a gradient that allows training of said minimum input value and said maximum input value defining said range of input data for quantizing said inputs of said convolution layers of the neural network model.

5. The method according to claim 4, wherein said minimum input value and said maximum input value for quantizing said inputs of said convolution layers of the neural network model are determined from said dataset used to train said neural network model.

6. The method according to claim 4, wherein said pseudo-quantization operations take into account a data container format of an edge device on which said neural network model will be executed.

7. The method according to claim 3, wherein said training comprises a quantization aware training process.

8. The method according to claim 1, wherein said convolution layers are implemented with Conv2D class operators.

9. The method according to claim 1, further comprising programming at least one edge device with a quantized neural network model and weights determined during the training of the modified neural network model.

10. The method according to claim 9, wherein programming the at least one edge device comprises burning the quantized neural network model and the weights into a die of the at least one edge device.

11. The method according to claim 1, wherein the quantized neural network generates one or more inferences about an input by performing one or more computer vision operations.

12. The method according to claim 11, wherein said input is generated by a sensor.

13. The method according to claim 12, wherein said sensor comprises a video camera.

14. The method according to claim 12, wherein said sensor and said quantized neural network are configured as part of an edge device.

15. The method according to claim 12, wherein said sensor and said quantized neural network are configured as part of at least one of a battery-powered device or a battery-powered security camera.

16. An apparatus comprising:
    a sensor to generate a data input; and
    a processor to generate one or more outputs in response to said data input based upon one or more inferences made by executing a pre-trained neural network model comprising a plurality of layers having a first input and output container format, wherein said pre-trained neural network model was trained by (i) modifying a neural network model by quantizing inputs of at least convolution layers of the neural network model from said first input and output container format to a second container format based on a range of input data defined by a minimum input value and a maximum input value and (ii) training the modified neural network model using a dataset that is representative of one or more desired inferences.

17. The apparatus according to claim 16, wherein said sensor comprises a video camera and the pre-trained neural network model generates the one or more inferences about said data input by performing one or more computer vision operations.

18. The apparatus according to claim 16, wherein said sensor and said processor are configured as part of an edge device.

19. The apparatus according to claim 16, wherein said sensor and said processor are configured as part of a battery-powered device.

20. The apparatus according to claim 16, wherein said sensor and said processor are configured as part of a battery-powered security camera.

* * * * *